US005454056A

United States Patent [19]
[11] Patent Number: 5,454,056
[45] Date of Patent: Sep. 26, 1995

Brothers

[54] LUMINOUS PULL-CORD FOR ELECTRICAL SWITCH OPERATION

[76] Inventor: Harlan J. Brothers, 103 Island View Ter., Branford, Conn. 06405-2657

[21] Appl. No.: 176,957

[22] Filed: Jan. 3, 1994

[51] Int. Cl.$^{6}$ .......... G02B 6/00

[52] U.S. Cl. .......... 385/16; 362/32; 385/25; 385/88; 385/92; 385/147; 385/901

[58] Field of Search .......... 362/32; 385/16, 385/25, 75, 88, 92, 147, 901

[56] References Cited

U.S. PATENT DOCUMENTS

| | | | |
|---|---|---|---|
| 3,819,928 | 6/1974 | Kuroyama et al. | 385/901 X |
| 4,623,217 | 11/1986 | Hallen | 385/16 |
| 4,887,190 | 12/1989 | Sadamune et al. | 362/32 |
| 5,140,659 | 8/1992 | Minds et al. | 385/66 |
| 5,222,165 | 6/1993 | Bohlinger | 385/16 |
| 5,311,410 | 5/1994 | Hsu et al. | 362/20 |

*Primary Examiner*—Frank Gonzalez

[57] ABSTRACT

A luminous pull-cord for facilitating the operation of an electrical switch, comprising a length of fiber optic cord coupled to and illuminated by a light source as a means for actuating said electrical switch whereby said light conducting fiber is grasped and then pulled.

24 Claims, 4 Drawing Sheets

LUMINOUS PULL-CORD FOR ELECTRICAL SWITCH OPERATION

BACKGROUND OF THE INVENTION

1. Field of the Invention

The present invention relates to the operation of a remote electrical switch, particularly under low light conditions. Such switches are used in the light bulb sockets that are typically found in closets, attics, basements, and lofts. They are also used in places such as hospital rooms and homes for the elderly in order to activate alarms.

2. Description of the Prior Art

At the present, the aforementioned switches generally use a simple pull-string or pull-chain for operation. Often, this string or chain is employed where it is attached to a switch that controls the only immediate source of light. This leads to the problem of grasping aimlessly in the dark to locate the light switch. Since this invention provides a luminous member for grasping, it therefore remedies the problem of finding a hanging pull-string under low light or no light conditions. It also provides, in the case of hospitals for example, a highly visible means for locating an emergency actuator.

Previous means of addressing this problem include wireless means and motion sensing means for switch activation. Both of these methods have inherent problems.

In the case of wireless means, the user is required to carry, or have on hand, a battery operated radio transmitter. This approach is inconvenient, for the user must keep track of the transmitter unit without which he or she is helpless. In addition, the transmitter can interfere with the operation of other radio frequency devices.

In the case of motion sensing means, this approach can be virtually useless in certain circumstances. For example, in places where it is necessary to facilitate the deliberate activation of an emergency alarm, typical motion sensing means would be prone to frequent false alarms.

SUMMARY OF THE INVENTION

Accordingly, it is an object of the present invention to provide an improved means for facilitating the operation of a remote electrical switch, particularly where there is a lack of adequate lighting.

Another object is to provide such means that are convenient to use.

A further object is to provide such means that are both effective and dependable.

It is also an object to provide such means that can find universal application.

It is another object to provide such means that are technically uncomplicated and inexpensive to manufacture.

It has been found that the above and other objects of the present invention are attained in a pull-cord member comprising a length of light conducting fiber such as a typical consumer grade optical fiber, fiber optic cord, or the like which is illuminated through means of a coupling assembly by a high brightness light emitting diode (LED). The LED can be powered directly from a 120 volt AC line, thereby obviating the need for batteries which are costly and inconvenient to maintain. The illuminated cord can be easily seen regardless of ambient lighting and can therefore be readily grasped in order to actuate an electrical switch.

Other features and advantages of the present invention will become apparent from the following description of the invention which refers to the accompanying drawings.

BRIEF DESCRIPTION OF THE DRAWING(S)

For the purpose of illustrating the invention, there is shown in the drawings an embodiment which is presently preferred; it being understood, however, that the invention is not limited to the precise arrangements and instrumentalities shown.

DETAILED DESCRIPTION OF THE PREFERRED EMBODIMENT

Figure 1:
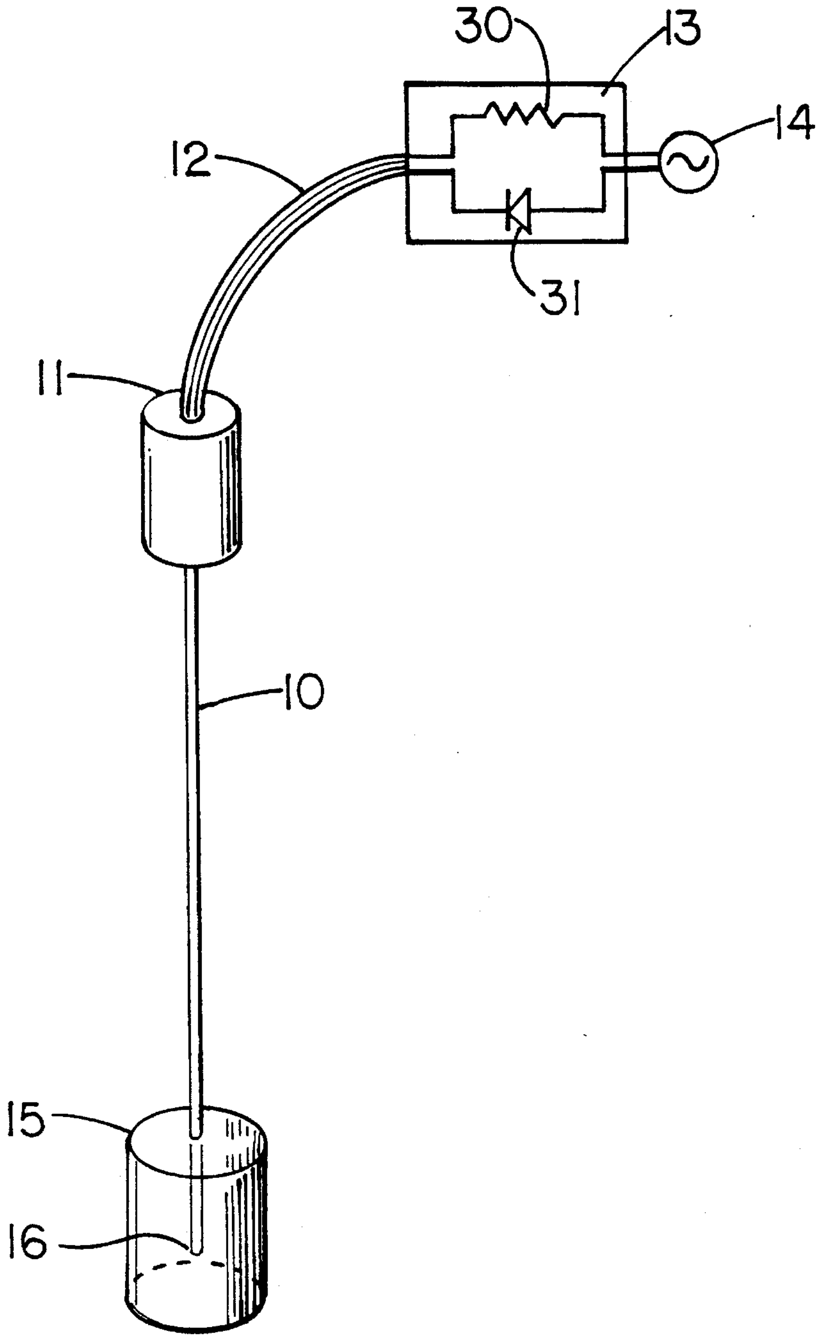
FIG. 1 is a side perspective view of the device in a hanging position, including a schematic representation of the power supply interface board.
Figure 1A:
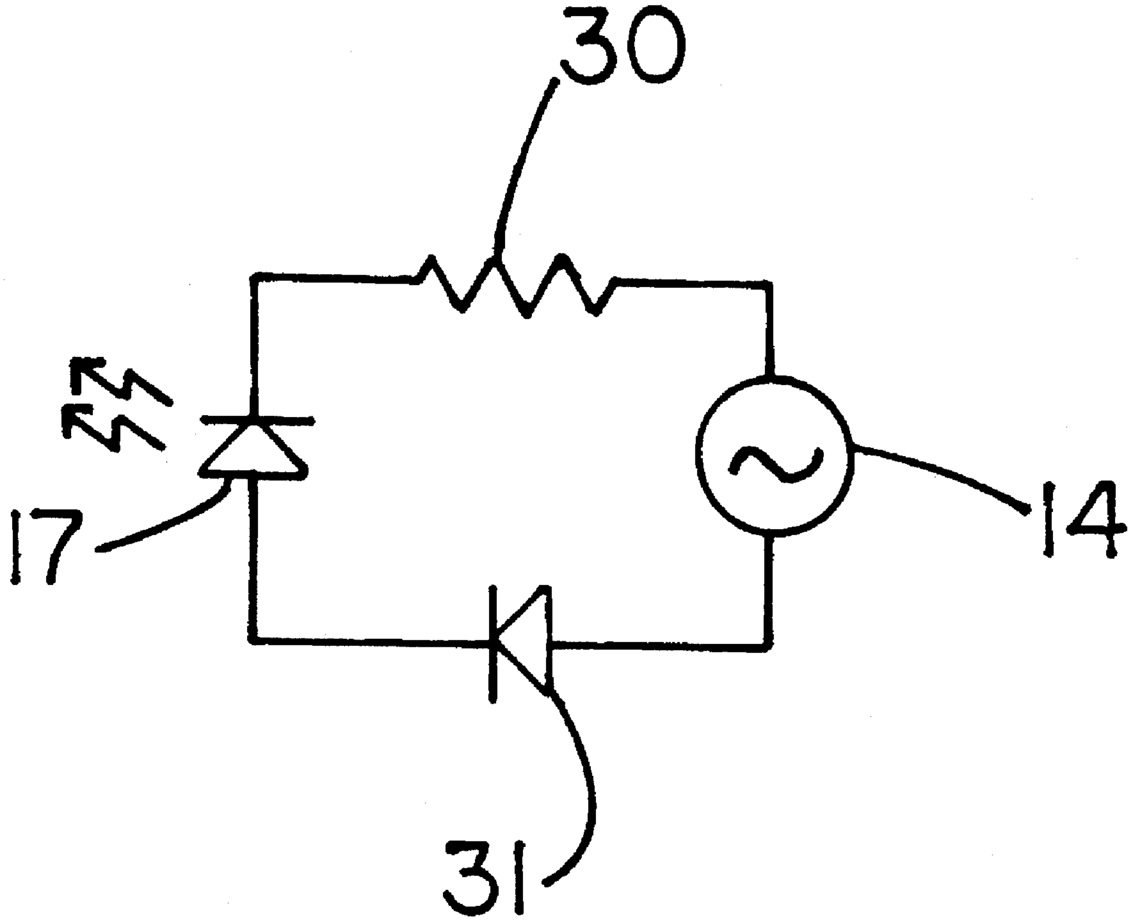
FIG. 1A is a circuit diagram of the electronic portion of the device.

Referring now to the drawings wherein like numerals indicate like elements, there is shown in FIGS. 1, 1A the pull-cord assembly of the present invention wherein the upper end of a length of fiber optic cord 10 extends partially into a small cylindrical housing 11. Therein it is encapsulated with an LED 17 to which it is coupled. Power is supplied to the LED 17 via the two conductor wire 12 which is connected to the power interface board 13 comprising a high wattage resistor 30 and a rectifying diode 31. The power interface board 13 is, in turn, connected to a 120 volt AC line 14. In order to make the device hang straight and to additionally facilitate grasping, the hanging end 16 of the fiber optic cord 10 is affixed inside a clear terminal weight 15. Furthermore, the hanging end 16 can be mirrored in order to reflect the light from the LED 17 in housing 11 back up through the fiber optic cord 10, thereby enhancing its brightness.

Figure 2:
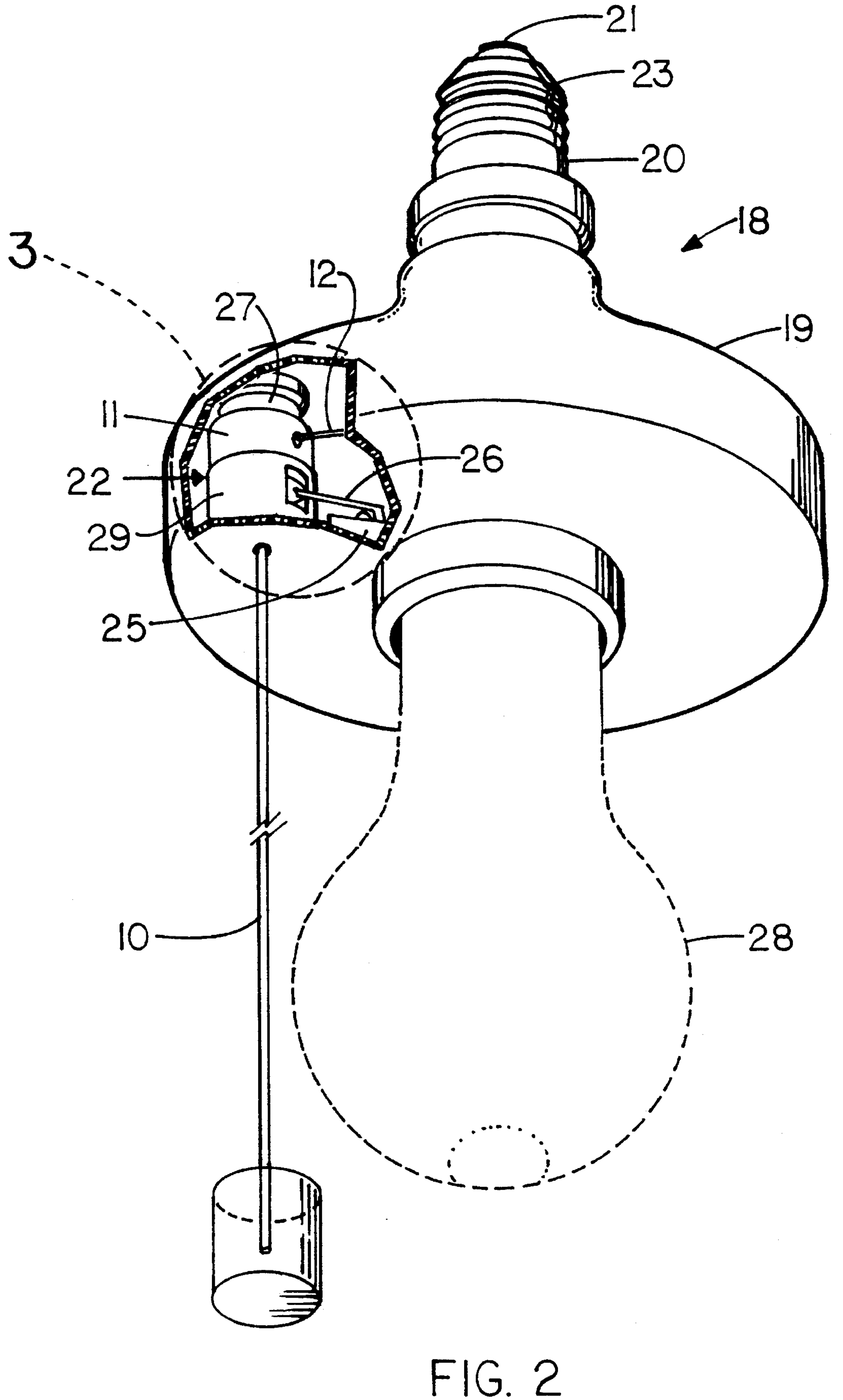
FIG. 2 is a perspective view of the device incorporated into a module that screws into an existing light bulb socket fixture.

FIG. 2 illustrates an application of the invention as it might be employed in a self contained module that includes an electrical switch. Such a module can therefore be screwed into an existing light bulb socket fixture (such as Leviton #29816-C) and avoid the need for rewiring.

Referring now to FIGS. 1, 2 the power interface board 13 is incorporated into the hollow mid-portion 19 of the module 18 wherein it is electrically connected to the contacts 21 and 23 from which it derives its power when the base portion 20 is screwed into an existing socket fixture. The power interface board 13, in turn, supplies current to the LED 17, FIG. 1A, inside the housing 11 by means of the two conductor wire 12. The LED 17, FIG. 1A, thus energized, shines through the fiber optic cord 10 and its light leaks radially outward rendering the cord highly visible. When the fiber optic cord 10 is pulled, the housing 11 is displaced downward in its cylindrical guide assembly 22.

Figure 3:
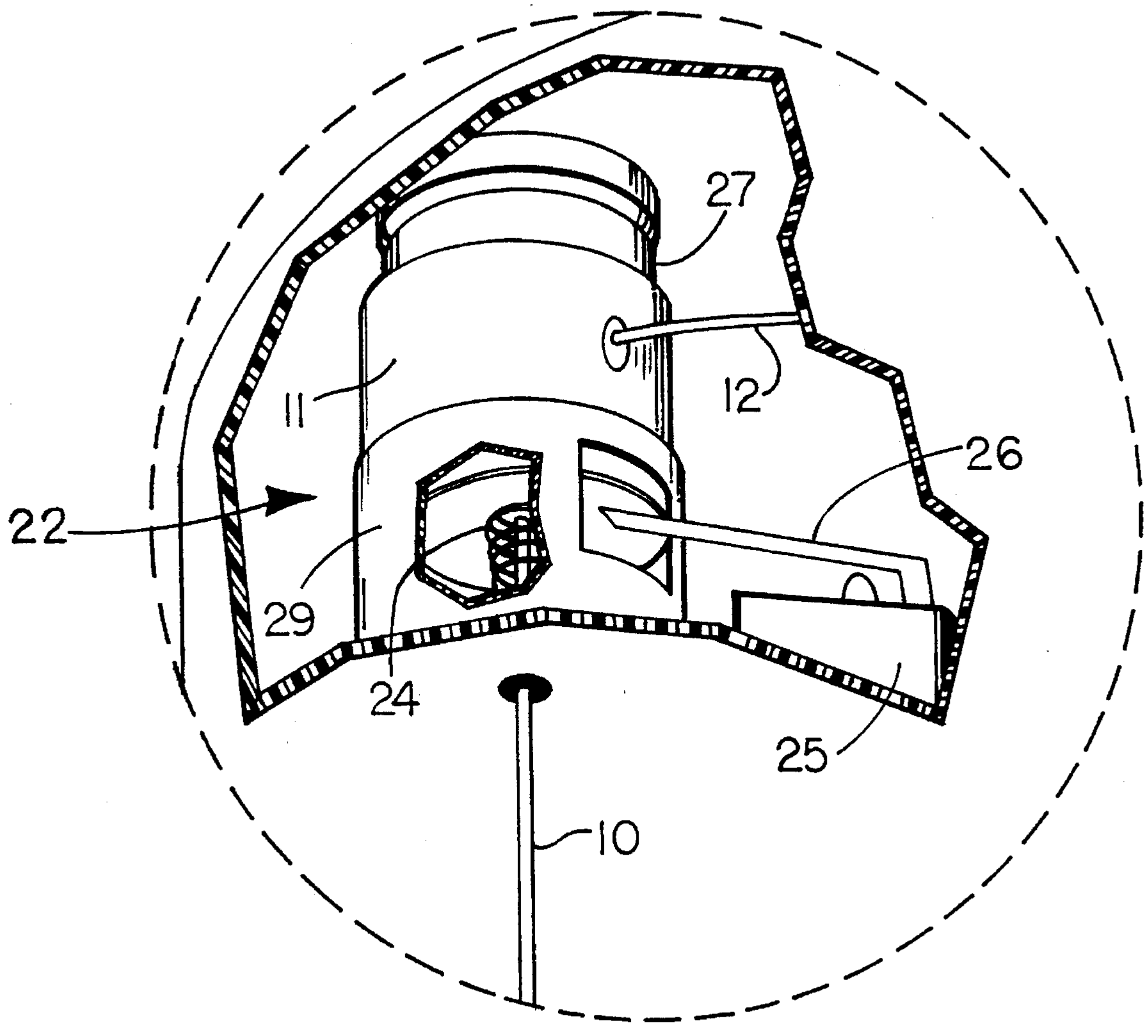
FIG. 3 is an enlarged view of the cutaway in Detail 3 of FIG. 2 including a second cutaway.

FIG. 3 shows a detailed perspective view of the guide assembly 22, comprising a partially open guide tube 29 and a spring 24. Seen through the cutaway in the guide tube 29 is the spring 24 which encircles the fiber optic cord 10 and supports the housing 11. The two conductor wire 12 enters at the top of the housing 11.

Referring now back to FIG. 2, when the fiber optic cord 10 is grasped and pulled, the housing 11 is downwardly displaced in the guide assembly 22. In so traveling it engages the switch member 26 which extends partially into the guide assembly 22 through the open portion of the guide tube 29. The switch member 26, in turn, activates the push-on/push-off electrical switch 25 which controls the power to the light bulb 28. When the fiber optic cord 10 is released, the spring 24, FIG. 3 returns the housing 11 to its initial position. Stopping member 27 limits the upward return of the housing 11.

With the invention employed as described herein, the fiber optic cord 10 will glow so that it can be seen, grasped, and then pulled on in order to switch the light bulb 28 on and off.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A luminous pull-cord for the operation of an electrical switch comprising:

a length of light conducting fiber, at least a portion of which is bare, as a means for actuating an electrical switch whereby said light conducting fiber is grasped and then pulled;

a light source; and a coupling member which joins one end of said light conducting fiber, the other end being unattached, to said light source such that the light from said light source is transmitted through said light conducting fiber rendering said light conducting fiber visible in darkness.

2. The pull-cord of claim 1, wherein said light source is a light emitting diode.

3. The pull-cord of claim 1, wherein said light source is powered by means of AC line current.

4. The pull-cord of claim 1, wherein the unattached end of said light conducting fiber includes terminal means for providing tension to keep said light conducting fiber straight.

5. The pull-cord of claim 1, wherein the unattached end of said light conducting fiber includes reflecting means to enhance the brightness of said light conducting fiber.

6. The pull-cord of claim 1, wherein said coupling member is incorporated into said electrical switch.

7. The pull-cord of claim 1, wherein a second coupling member is employed for the purpose of operatively engaging said electrical switch.

8. The pull-cord of claim 1 wherein said coupling member additionally provides means for operatively engaging said electrical switch.

9. A luminous pull-cord for the operation of an electrical switch comprising:

a length of light conducting fiber as a means for actuating an electrical switch whereby said light conducting fiber is grasped and then pulled;

a light source;

a coupling member which functions to join one end of said light conducting fiber to said light source such that the light from said light source is transmitted through said light conducting fiber rendering said light conducting fiber visible in darkness; and A housing adapted to screw into a standard light bulb socket and which also includes socket means to accept and provide power to a light bulb and which additionally incorporates said electrical switch electrically connected between a said power and said socket means, said electrical switch being activated by said light conducting fiber.

10. The pull-cord of claim 9 wherein said coupling member additionally provides means for operatively engaging said electrical switch.

11. The pull-cord of claim 9, wherein said light source is a light emitting diode.

12. The pull-cord of claim 9, wherein said light source is powered by means of AC line current.

13. The pull-cord of claim 9, wherein the unattached end of said light conducting fiber includes terminal means for providing tension to keep said light conducting fiber straight.

14. The pull-cord of claim 9, wherein the unattached end of said light conducting fiber includes reflecting means to enhance the brightness of said light conducting fiber.

15. The pull-cord of claim 9, wherein said coupling member is incorporated into said electrical switch.

16. The pull-cord of claim 9 wherein a second coupling member is employed for the purpose of operatively engaging said electrical switch.

17. A luminous pull-cord for the operation of an electrical switch comprising:

a length of light conducting fiber, at least a portion of which is bare, as a means for actuating an electrical switch whereby said light conducting fiber is grasped and then pulled;

a light source; and a coupling member which functions to join one end of said light conducting fiber, the other end being unattached, to said light source such that the light from said light source is transmitted through said light conducting fiber rendering said light conducting fiber visible in darkness.

18. The pull-cord of claim 17 wherein said coupling member additionally provides means for operatively engaging said electrical switch.

19. The pull-cord of claim 17, wherein said light source is a light emitting diode.

20. The pull-cord of claim 17, wherein said light source is powered by means of AC line current.

21. The pull-cord of claim 17, wherein the unattached end of said light conducting fiber includes terminal means for providing tension to keep said light conducting fiber straight.

22. The pull-cord of claim 17, wherein the unattached end of said light conducting fiber includes reflecting means to enhance the brightness of said light conducting fiber.

23. The pull-cord of claim 17, wherein said coupling member is incorporated into said electrical switch.

24. The pull-cord of claim 17, wherein a second coupling member is employed for the purpose of operatively engaging said electrical switch.

* * * * *